United States Patent [19]
Ohashi et al.

[11] Patent Number: 5,381,460
[45] Date of Patent: Jan. 10, 1995

[54] MONITOR MODE IN A PORTABLE TELEPHONE

[75] Inventors: Susumu Ohashi, Coppell, Tex.; Hideo Tateishi; Toshiaki Fujikura, both of Chiba, Japan

[73] Assignees: Uniden America Corp.,, Ft. Worth, Tex.; Uniden Corporation, Tokyo, Japan

[21] Appl. No.: 175,753

[22] Filed: Dec. 30, 1993

[51] Int. Cl.$^6$ ............................................. H04M 11/00
[52] U.S. Cl. ........................................ 379/58; 379/56
[58] Field of Search ............... 379/56, 58, 60, 61, 379/63, 96, 165, 419, 428, 422, 433; 455/33.1, 68, 70

[56] References Cited

U.S. PATENT DOCUMENTS

| | | | |
|---|---|---|---|
| 4,456,793 | 6/1984 | Baker et al. | 379/56 |
| 4,468,539 | 8/1984 | Schober | 179/2 |
| 4,737,976 | 4/1988 | Borth et al. | 379/58 |
| 4,829,554 | 5/1989 | Barnes et al. | 379/58 |
| 4,969,181 | 11/1990 | Ito | 379/61 |
| 5,014,294 | 5/1991 | Kromenaker et al. | 379/58 |
| 5,301,224 | 4/1994 | Major | 379/58 |

Primary Examiner—Curtis Kuntz
Assistant Examiner—William Cumming
Attorney, Agent, or Firm—Daniel R. Brown

[57] ABSTRACT

A portable cellular telephone having a loud speaker for implementing a monitor mode function which operates separately from the normal head set mode of operation and further has a default mode selector which varies the monitor mode function depending on whether a call is being initiated or received. The portable cellular telephone further has a display for displaying the current mode of the monitor mode function.

7 Claims, 8 Drawing Sheets

SPEAKER CONTROL CIRCUIT

FIRST AMPLIFIER

HEAD SET CONTROL CIRCUIT

SECOND AMPLIFIER

MICROPHONE CIRCUIT

MONITOR MODE IN A PORTABLE TELEPHONE

TECHNICAL FIELD OF THE INVENTION

This invention relates to portable telephones and more particularly to call monitoring in hand-portable cellular telephones.

BACKGROUND OF THE INVENTION

Portable telephones and more particularly cellular telephones are now widely used because of the convenience and mobility that such devices offer. The extensive build up of cellular telephone service coverage has contributed to the wide use of such devices.

As subscribers of wire line telephone service make the transition to cellular service, they expect the same levels of features and functionality in the cellular product as they receive from their wire line products. In the past, often times this was not feasible because of the size, power and cost constraints place on the designers of cellular telephone products.

Cellular telephones are traditionally designed for one of three basic product categories; mobile, transportable, and portable. Mobile products are typically mounted in a motor vehicle and draw their power for the vehicle power supply. Mobile products are characterized as relatively large, and as having a virtually unlimited amount of electrical current available. Trans-portable products are similar to mobile products, but they can be carried by the subscriber. Trans-portable products comprise a large capacity battery and generally offer the same features and functions that a mobile product offers.

Potable products differ from the other categories in that they are much smaller and are designed to be easily carried on the person of the subscriber. Yet, subscribers still desire to have a full compliment of features as would be available in a wired, mobile, or trans-portable telephone.

it is common for wired telephones to incorporate a loud speaker so the subscriber can monitor the call progress before placing the headset next to their ear. Alternatively, the loud speaker may be connected to a circuit including the microphone so that the telephone may be operated in a hands-free mode wherein the user can both speak and listen in a conversation without holding the hand set near their head. The use of a loud speaker is especially useful and desirable as more and more services such as voice mail and automated attendants are employed. When these type of services are employed, the subscriber may spend a substantial portion of a conversation listening as opposed to conversing with another individual. In such a circumstance, there is no need to hold the head-set positioned so that the microphone is in close proximity to the subscriber's mouth. In fact, not holding the head-set frees the subscriber's hands for note taking or other activities.

Incorporating a monitor feature in a portable cellular telephone has been difficult because of several constraints and certain operational problems involved with designing such a product. Among these are the necessarily close proximity between the loud speaker and the microphone and the potential for feed-back in such a design. Also, the limited space for controls to operate such a feature and the need to make the feature easy no operate and configure have prevented any manufacturers from offering such a feature in a portable cellular telephone.

SUMMARY OF THE INVENTION

A portable cellular telephone is disclosed which comprises a novel monitor mode function. The monitor mode function allows the subscriber to alternatively choose between the normal mode of conversing wherein the portable telephone is held close to the ear and mouth of the subscriber and wherein the conversation proceeds as a duplex conversation, or a monitor mode of conversing wherein a loud speaker inside the portable telephone is enabled while simultaneously disabling the microphone so that the subscriber can monitor the call progress without holding the portable telephone close to their ear. In the monitor mode, the conversation is listen-only, or simplex.

The activation and deactivation of the monitor mode function is controlled by a single push button which toggles between an activated and a deactivated state. In the activated state, the loud speaker is enabled to reproduce the audio signal received by a receiver in the portable telephone. When the monitor mode function is in the deactivated state, the received signals and the transmit signals are connected to an ear speaker and a microphone respectively. During a conversation, the portable telephone is held close to the ear and mouth of the subscriber in the deactivated mode.

Activation of the monitor mode function also disables the conventional ear speaker and microphone. Disabling the microphone prevents feed-back of the received audio signal to the transmit path. Disabling the ear speaker reduces the overall power consumption on the portable telephone.

The electronic implementation of the monitor mode function is accomplished with minimum parts count which reduces cost and increases reliability. In one embodiment, an condenser microphone is used. The microphone is disabled in the monitor mode function activated state by turning off the microphone bias voltage. Similarly, the ear speaker is disabled and the loud speaker is enabled in the monitor mode function active state by controlling the dc power to the respective final amplifiers, rather than employing some other switching means.

In another embodiment, a tone generating circuit together with a tone volume control circuit are provided which allow for separate control of the audio and various call progress tones which are typically employed in a portable telephone. The separately controlled tone signals are summed with the received audio signals at the input of the loud speaker and ear speaker amplifiers. In this manner, the activation and deactivation of the monitor mode functions also controls the routing of the tone signals with no additional parts required.

Aside from activating and deactivating the monitor mode function manually, it is desirable to provide for default state selection so that each subscriber can customize the operation depending on their individual needs. A default function is provided which is embodied in a controller that has a default function selector. The subscriber can choose either a first or second default state wherein the monitor mode function is activated or deactivated at the origination of outgoing telephone calls. For incoming calls, the monitor mode function is disabled regardless of the default condition because the first action by the subscriber upon answering an incoming call is to speak, such as saying "hello" for example. By employing this combination of functionality, subscribers can use their portable telephone in the desired default mode without unnecessary confusion.

A display is included which is coupled to the controller and the display has a monitor mode display state so that the subscriber can visually recognize the current operation mode as well as view the mode selection as the various selectors are actuated.

BRIEF DESCRIPTION OF THE DRAWINGS

The features of the present invention which are believed to be novel are set forth with particularity in the appended claims. The invention, together with further objects and advantages thereof, may be best understood by making reference to the following description taken in conjunction with the accompanying drawings, in the several figures of which like reference numerals identify identical elements, and wherein:

DETAILED DESCRIPTION

Figure 1:
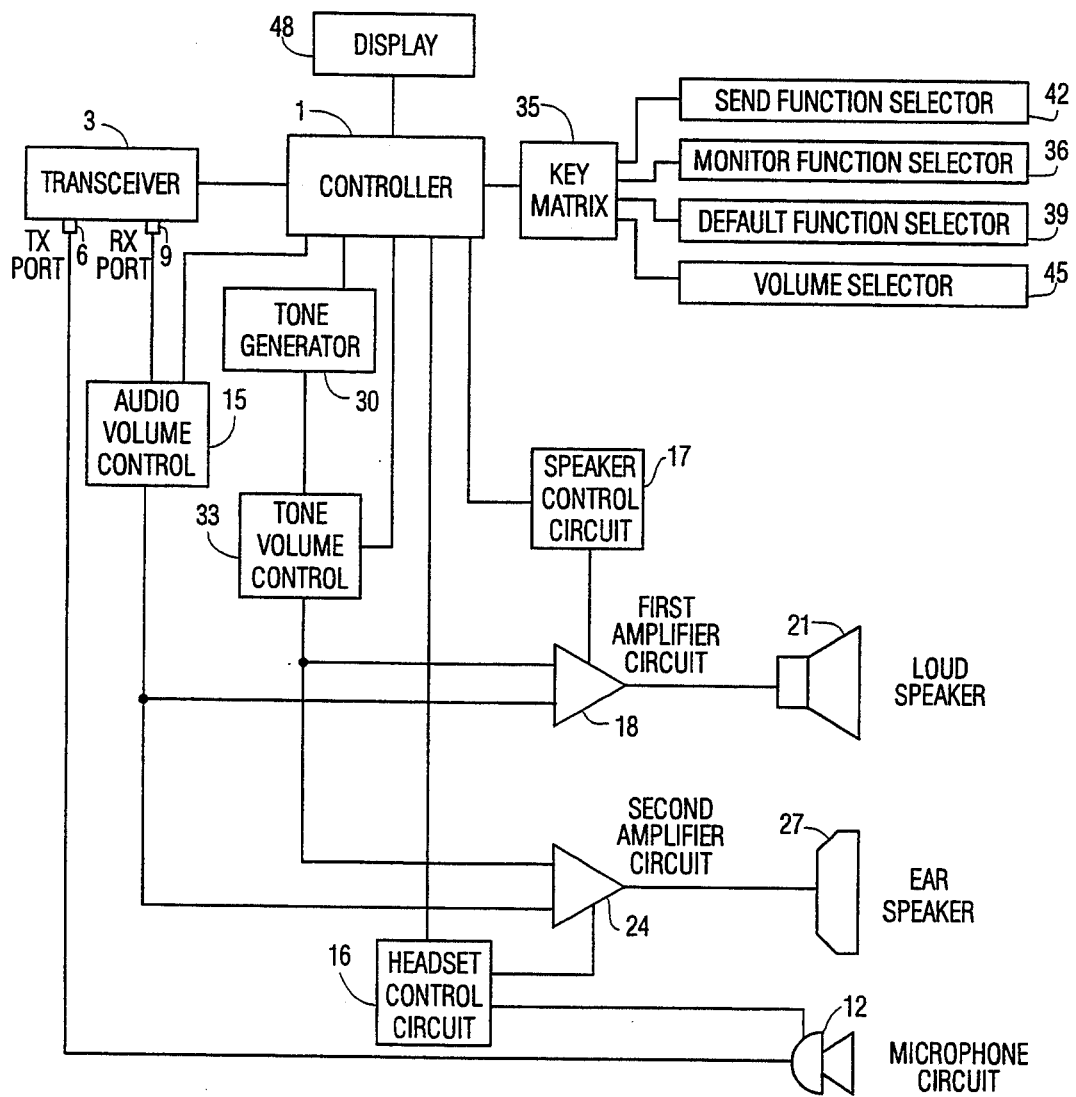
FIG. 1 is an electrical block diagram of the preferred embodiment.

Reference is directed to FIG. 1 which is an electrical block diagram of the preferred embodiment of the present invention. The portable cellular telephone comprises a controller 1 coupled to a transceiver 3 which operates in accordance with one of the cellular communications standards such as AMPS, for example. The controller 1 and transceiver 3 together operate to initiate and received cellular telephone calls in accordance with the standard. The transceiver 3 has a transmit port 6 for inputting signals to be transmitted by the transceiver. Further, the transceiver 3 has a received port 9 for outputting signals having been received by the transceiver 3.

The cellular telephone comprises a microphone circuit 12 for transducing signals suitable for inputting to the transmit port 6. The microphone circuit 12 is further coupled to a headset control circuit 16 which is in-turn coupled to the controller 1 so that the headset control circuit 16 is able to enable and disable the microphone circuit 12 under digital control of the controller 1.

Signals received by the transceiver 3 and output from the receive port 9 may be coupled through an audio volume control 15 which is coupled to the controller 1 so that volume may be controlled be the controller 1 rather than through the use of a conventional manual volume control potentiometer. Although the use of a manual potentiometer would be acceptable for the present invention. It should be understood that the audio volume control 15 under control of the controller 1 is advantageous because the volume of other tones needed for call progress indications can be coordinated with the audio volume.

The audio volume control 15 is further coupled to the inputs of two amplifiers, a first amplifier 18 and a second amplifier 24. The output of the first amplifier 18 drives a loud speaker 21. A suitable loud speaker 21 is a model SU-28W10014 as manufactured by Line Denki of Japan. The output of the second amplifier 24 drives an ear speaker 27. A suitable ear speaker is a model CD20AARC as manufactured by Taiyo Yuden of Japan. The first amplifier is coupled to a speaker control circuit 17 which is further coupled to the controller 1 such that the speaker control circuit 17 can enable and disable the output of the first amplifier 18 under the control of the controller 1 thereby effectively turning the audio output of the loud speaker 21 on or off. Also, the second amplifier circuit 24 is coupled to the headset control circuit 16 so that the headset control circuit 16 can enable and disable the second amplifier 24 output, thereby effectively turning the ear speaker 27 audio signal on or off. It should be noted that disabling the second amplifier circuit 24 provides a power saving measure by eliminating the current supply needed to drive this circuit and the ear speaker 27. The headset control circuit 16 is controlled by the controller 1 such that the microphone circuit 12 and second amplifier 24 output are simultaneously enabled and disabled causing the headset function of the portable telephone to be enabled and disabled. Furthermore, the speaker control circuit 17 is separately controlled by the controller 1 such that the first amplifier can be enabled and disabled independently of the headset control circuit 16 state.

A tone generator 30 may be provided for generating tones which can be used to produce call progress tones. The tone generator 30 is coupled to the controller 1 and is controlled thereby. The output of the tone generator 30 is coupled to a tone volume control 33 which is further coupled to the controller 1 in a similar fashion to the audio volume control 15. The tone volume control allows the controller 1 to independently control the volume of the tones as compared to the audio signals. The audio volume control 15 and tone volume control 33 may be portions of the model CXD1272 integrated cellular control device as manufactured by Sony Corp.

The output of the tone volume control 33 is coupled to the inputs of the first amplifier 18 and the second amplifier 24. The tones signals are summed with the receive port 9 signals also coupled to the input of both amplifiers. In this way, both signals are reproduced by the loud speaker 21 and ear speaker 27 depending on whether or not the first amplifier 18 and/or the second amplifier 24 are enabled.

The suggested manner of operating the monitor mode feature in accordance with the preferred embodiment of the present invention is to enable the first amplifier 18 and simultaneously disable the second amplifier 24 and the microphone circuit 12. In this monitor mode, the received signal is reproduced by the loud speaker 21. At the same time the ear speaker 27 does not reproduce the received audio signal, nor does the microphone circuit 12 provide a signal to the transmit port 6 of the transceiver 3. This function allows the subscriber to listen to a telephone conversation without holding the portable telephone near the ear and mouth, in the headset mode of operation.

In order to facilitate the use of the monitor mode function, several user interface devices are provided in the preferred embodiment. Each of these devices is coupled to a key matrix 35 which is further coupled to the controller 1. A monitor function selector 36 is provided so that the monitor mode function can be selectively enabled and disabled. Additionally, a default function selector 39 is provided so that the default operation of the monitor mode function can be controlled. This function will be described more fully below.

A send function selector 42 is provided to initiate calls and further to control the monitor mode function. Also, a volume selector 45 is provided to allow the input of the desired volume to the controller 1 so that the controller 1 can control the audio volume control 15 and tone volume control 33 in accordance with the desired volume setting.

Finally, a display 48 is provided to display, among other things, the instant state of the monitor mode function.

Figure 2:
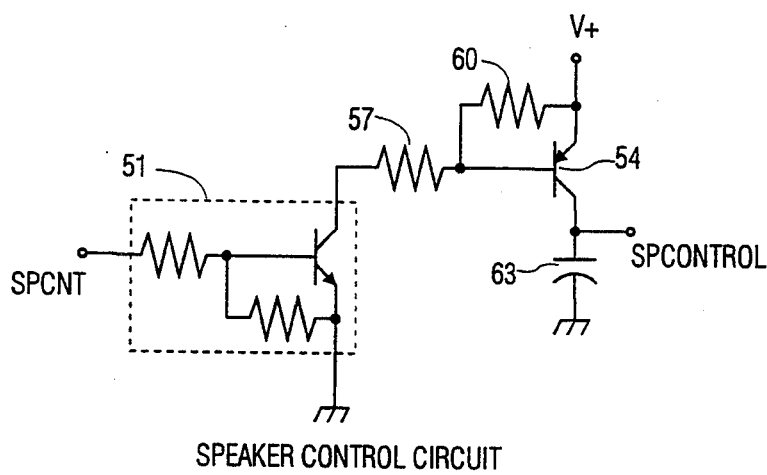
FIG. 2 and FIG. 3 are schematic diagrams of the first amplifier circuit in the preferred embodiment.
Figure 3:
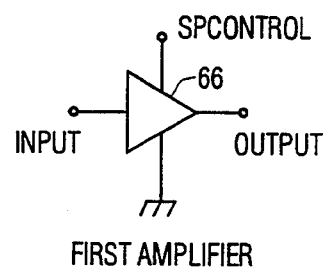

Reference is directed to FIG. 2 and FIG. 3 which are schematic diagrams of the speaker control circuit 17 and first audio amplifier 18, respectively. FIG. 2 specifically shows the speaker control circuit which receives a digital control signal SPCNT from the controller 1 and outputs a control signal SPCONTROL for turning on and off the direct current power to the first amplifier 66. It is this turning on and turning off of the direct current power to the first amplifier which enables and disables the loud speaker 21. FIG. 3 simply illustrates the connections to the first amplifier. In FIG. 2, the SPCNT signal from the controller 1 drives an NPN switching transistor device 51 which provides an inverted output and current gain. The NPN switching transistor device may be a model GA1L4M as manufactured by NEC Corp. The SPCNT signal is a logical signal and may operate a standard CMOS technology high or low level for example. The output of NPN transistor switching device 51 drives the base of a PNP transistor 54 through a resistor 57. The PNP transistor 54 may be a 25B1115-YK as manufactured by NEC Corp. The base and emitter of PNP transistor 54 are coupled by resistor 60 to bias the base of that transistor when the transistor switching device 51 is driven into cut-off by the SPCNT signal. Suitable values for resistors 57 and 60 are 1 kilo-ohms and 4.7 kilo-ohms, for example. The emitter of the PNP transistor 54 is coupled to a power supply which provide the V+ voltage signal to various devices within the portable cellular telephone. The V+ voltage may be 6 volts, direct current, for example.

The output of speaker control circuit SPCONTROL is taken at the collector of PNP transistor 54. Additionally, the output SPCONTROL is coupled to ground with a capacitor 63. A suitable value for capacitor 63 is 16 micro farads, for example. Capacitor 63 serves to decouple the power supply of the first amplifier 66 and control switching transients which may occur on the SPCONTROL signal line.

The first amplifier 66 has the SPCONTROL signal coupled to its positive power supply terminal. The input and output signal connections are discussed elsewhere. The first amplifier may be a model NJM2073 as manufactured by Japan Radio Corporation.

Figure 4:
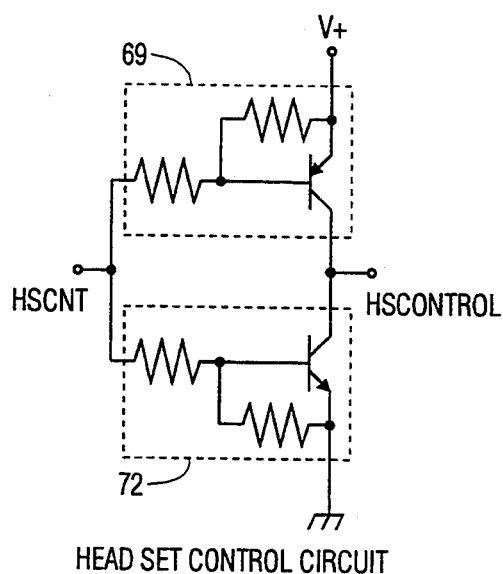
FIG. 4 and FIG. 5 are schematic diagrams of the second amplifier circuit in the preferred embodiment.

References is directed to FIG. 4 which is a schematic diagram of the headset control circuit 16 which converts the CMOS level HSCNT signal, output from the controller 1, to a higher current signal HSCONTROL. HSCONTROL is logically inverted with respect to HSCNT. The headset control circuit 16 is comprised of a complimentary pair of PNP and NPN switching transistor devices 69 and 72 respectively. The collectors of the PNP 69 and NPN 72 devices are coupled and form the HSCONTROL output signal. Further, the bases of the PNP 69 and NPN 72 devices are coupled and form the input which is coupled to the HSCNT signal from the controller 1. The emitter of the PNP device 69 is coupled to the V+ power supply and the emitter of the NPN device 72 is coupled to ground. It should be noted that for the headset control circuit to function properly, the HSCNT high state voltage and V+ must be equal or HSCNT muse be within the forward bias voltage drop of the base-emitter junction of the PNP device 69 of V+. This is necessary so that a logical high signal on the HSCNT line will drive the PNP device 69 into cut-off. PNP transistor switching device 69 may be a model GN1L4M as manufactured by NEC Corp. and NPN switching device 72 may be a model GA1E4M as manufactured by NEC Corp.

In summary, the headset control circuit functions as a power supply switch as the HSCNT signal changes between logical high and low. When HSCNT is high, the PNP device 69 is driven into cut-off and the NPN device 72 is driven into saturation. The makes the HSCONTROL output a low impedance path to ground, effectively eliminating power to devices connected to HSCONTROL. On the other hand, when HSCNT is logically low, the PNP device 69 is driven into saturation and the NPN device 72 is driven into cut-off. In this state, HSCONTROL is held near the V+ potential and thereby forms a suitable power supply signal to any devices connected to HSCONTROL. This circuit forms an inexpensive switching device using only two components.

Figure 5:
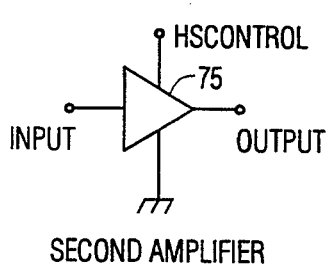

Reference is directed to FIG. 5 which is a schematic diagram of the second amplifier 75. The second amplifier 75 may be a model M5223FP as manufactured by Mitsubishi. The HSCONTROL signal is coupled to the positive power supply pin and controls the operation of the amplifier. The connection to the input of the second amplifier 75 is discussed in reference to FIG. 1. The output of the second amplifier 75 is coupled to the ear speaker 27. By virtue of this connection, the controller 1 is able to enable and disable the ear speaker 27 through manipulation of the HSCNT signal which controls the HSCONTROL signal through the headset control circuit 16.

None that it is useful to decouple the power supply pin of the second amplifier 75 using a capacitor for the purpose of reducing noise transients being reproduced by the ear speaker 16. However, the subscriber will usually hold the portable telephone away from the ear as the monitor function is enabled and disabled. Therefore, the transient is unlikely to be heard and is therefore not objectionable assuming the overall transients do not exceed any maximum ratings of devices used in the circuit.

Figure 6:
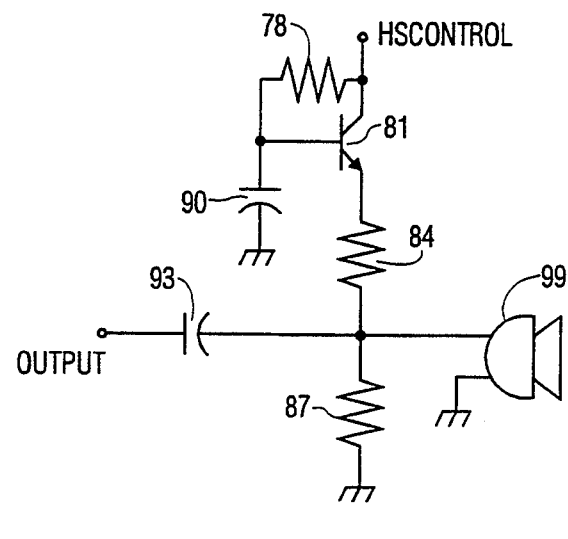
FIG. 6 is a schematic diagram of the microphone circuit in the preferred embodiment.

Reference is directed to FIG. 6 which is a schematic diagram of the microphone circuit 12. This circuit uses the HSCONTROL signal as a power source to energize a condenser microphone 99. A suitable microphone is a model MK432 as manufactured by Matsushita. The output of this microphone is thereby enabled and disable as HSCONTROL changes states. The HSCONTROL signal is coupled to the collector of an NPN transistor 81. NPN transistor 81 may be a model 2SC4177-L6 as manufactured by NEC Corp. The collector and base of the NPN transistor 81 are coupled by resistor 78 to bias the base such that the collector-emitter junction is driven into saturation whenever HSCONTROL is near the V+ potential. A decoupling capacitor 90 is coupled between the base of the NPN transistor 81 and ground to control transients. The emitter of the NPN transistor is connected to voltage divider circuit comprised of resistors 84 and 87. Resistor 84 having a first node connected to the emitter of transistor 84 and a second node connected to resistor 87, while the opposite node of resistor 87 is coupled to ground. The ratio of these resistors is selected so that the correct biasing voltage is available at the junction between resistors 84 and 87 to operate a condenser microphone. Suitable values for resistors 84 and 87 are 2.7 kilo-ohms and 10 kilo ohms, respectively. The output signal of the condenser microphone 99 is coupled to the common node between resistors 84 and 87. This node is further coupled to capacitor 93 to decouple the direct current bias voltage introduced by the above mentioned voltage divider. The opposite node of capacitor 93 forms the output point of the microphone circuit 12.

Figure 7:
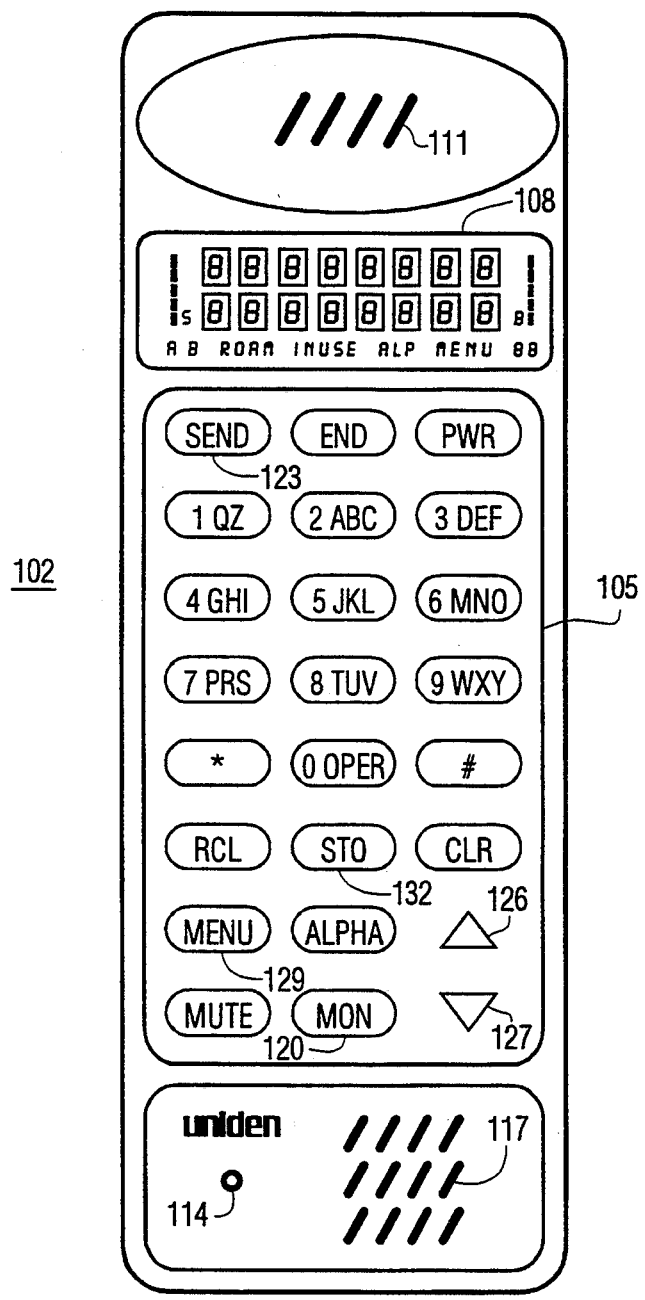
FIG. 7 is a diagram of the user interface in the preferred embodiment.

Reference is directed to FIG. 7 which is a diagram of a portable cellular telephone in the preferred embodiment. The cellular telephone 102 comprises a keypad 105 and a display 108. A conventional ear speaker 111 and microphone 114 are also provided so that the cellular telephone 102 can be used in the conventional manner whereby the entire unit is held in close proximity to the subscriber's ear and mouth as in a head set mode of operation so that a conversation can be had.

A loud speaker 117 is provided so that the portable cellular telephone 102 can be used as a call monitoring device in addition to the conventional method of use. The loud speaker is characterized as being compact enough to fit inside the small portable telephone, yet powerful enough to reproduce audio signals that can be heard several feet away from the portable telephone.

The keypad 105 is similar to a conventional cellular portable telephone in that it comprises the digits "0" through "9', the "*" and "#", and a power key. Certain keys for other features are present, but are not useful for the preferred embodiment of the present invention. The preferred embodiment of the present invention utilizes several keys on the keypad including, the "MON" 120 key, the "SEND 123 key, the volume control and menu selection up and down arrow 126, 127 keys, the "MENU" 129 key and the "STO" 132 key. The use of these various keys will become obvious as later described. Each of these keys is an element in a key matrix which is coupled to the controller 1. The controller 1 interprets the key strokes and translates them into various functions.

Figure 8:
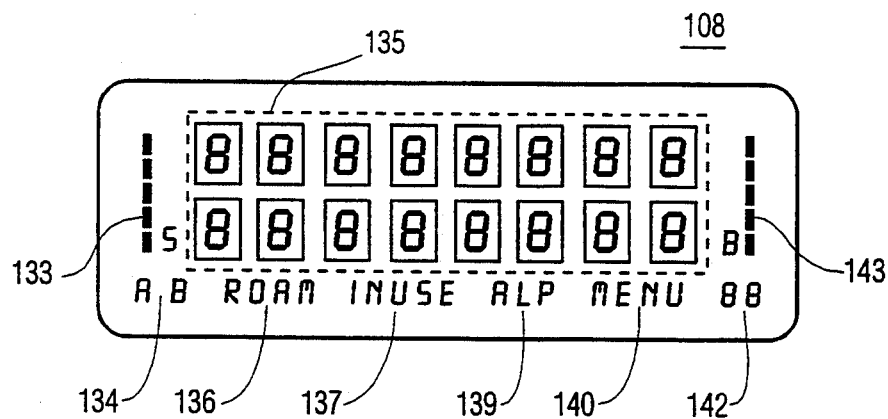
FIG. 8 and FIG. 9 and FIG. 10 are diagrams of the display in the preferred embodiment.
Figure 9:
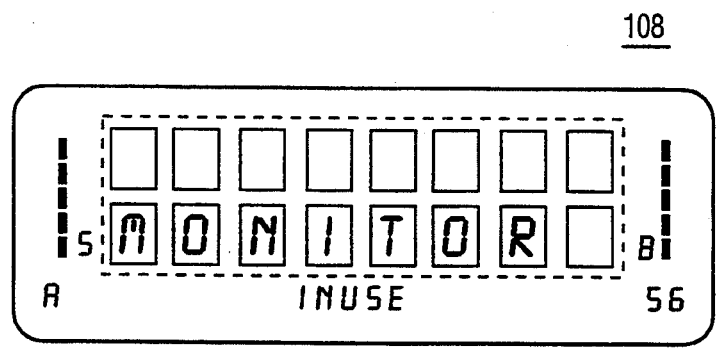
Figure 10:
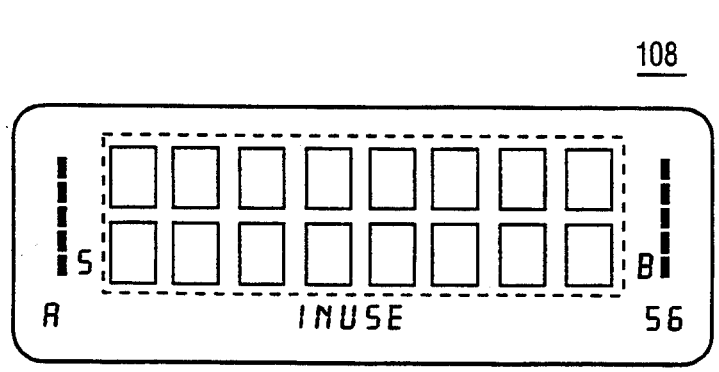

Reference is directed to FIG. 8, FIG. 9, and FIG. 10 which are diagrams of the display 108 of the portable cellular telephone in the preferred embodiment. FIG. 8 shows the display 108 with all digits and icons active and serves as a reference. The display 135 comprises sixteen alpha-numeric digits, each of which has full alpha-numeric capability so that any combination of letters and numerals can be displayed. Additionally, the display 135 comprises a signal strength meter 133, an "A -B" system indicator 134, a "ROAM" icon 136, and "INUSE" icon 137, an alpha-mode, "ALP" icon 139, a "MENU" icon 140, a two-digit menu indicator 142, and a battery power indicator 143. FIG. 9 shows the display in the monitor function active state. FIG. 10 shows the display in the standby state.

Figure 11:
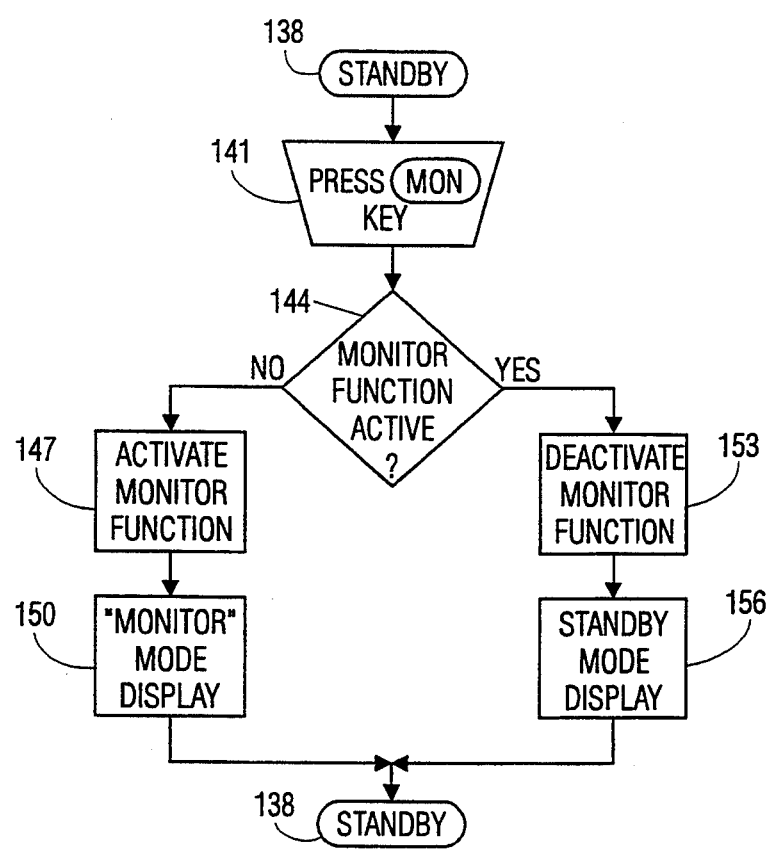
FIG. 11 is a flow diagram of the monitor function activation and deactivation sequence in the preferred embodiment.

Reference is directed to FIG. 11 which is a flow diagram or the monitor mode function activation and deactivation sequence. The portable telephone is normally in the standby condition as in step 138. In this condition, the telephone is ready to receive commands or to receive or place a telephone call. The subscriber changes the state of the monitor function be pressing the "MON" key at step 141. At step 144, the controller 1 checks to see if the monitor function is presently active or not. If the monitor function is not active, the controller activates the monitor function at step 147. Subsequently, the controller causes the display to display "MONITOR" at step 150. This indicates to the subscriber that the monitor function is active. It is to be understood that other display states or icons could be used to make this same indication. Upon having activated the monitor function and having displayed the status, the controller returns to the standby condition at step 138.

Returning to step 144, if on the other hand, the monitor or function is active, the controller deactivates the monitor function at step 153. Subsequently, the controller returns the display to the standby mode at step 156. See FIG. 10 for reference to the standby mode display. Finally, the controller returns to the standby condition at step 138.

The forgoing procedure allows the subscriber to toggle the monitor mode feature on and off by simply pressing the "MON" key 120.

Figure 12:
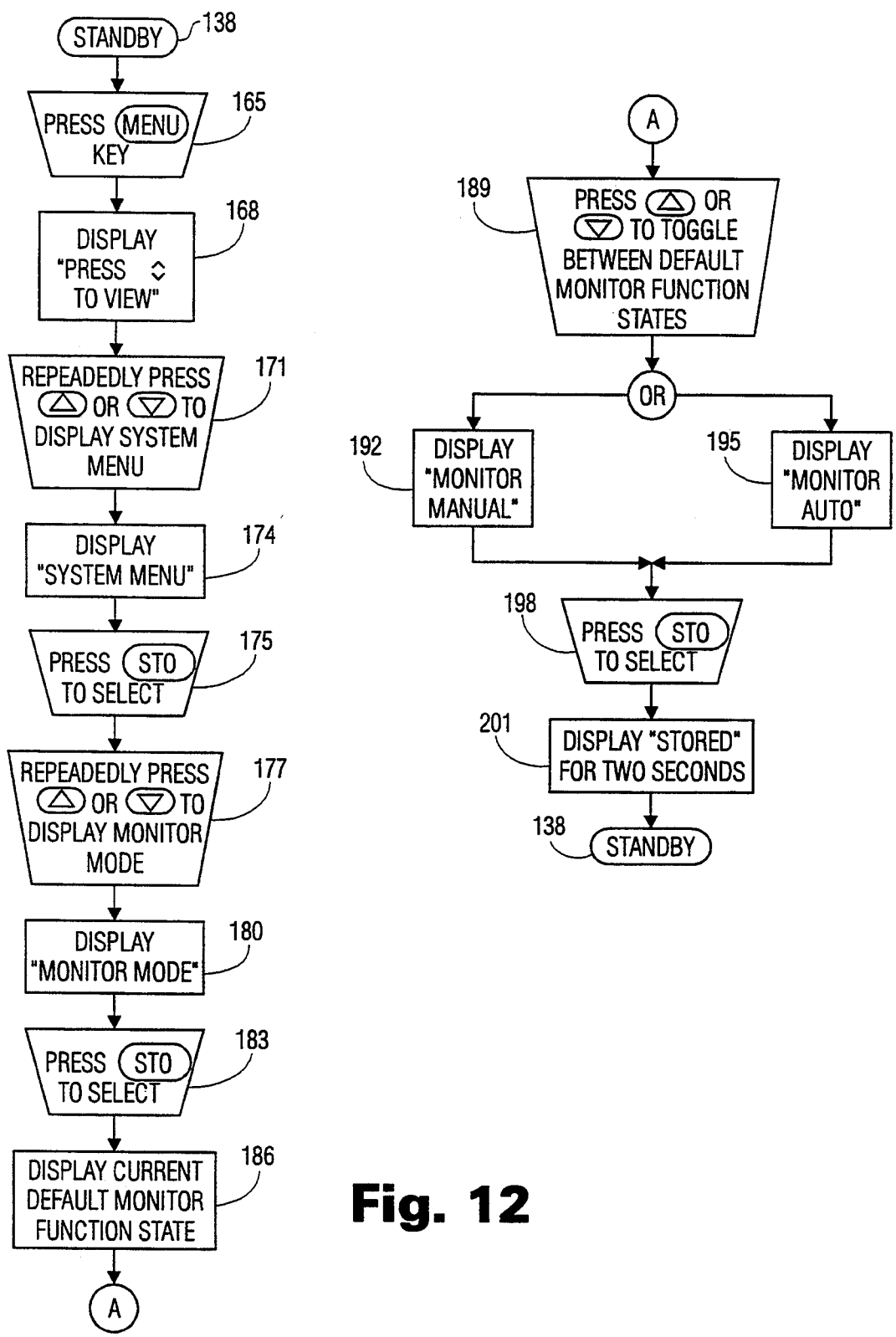
FIG. 12 is a low diagram of the monitor function default state selection sequence in the preferred embodiment.

Reference is directed to FIG. 12 which is a flow diagram of the monitor mode function default state selection procedure. This procedure involves a sequence of menu selections which are accessed from the standby condition at step 138. The subscriber presses the "MENU" key at step 165 and the controller responds by displaying the instruction to press the up or down arrow keys to view the desired menu selection at step 168. The subscriber repeated presses either the up or down arrow key to scroll through a list of menus at step 171. The subscriber stops scrolling when "SYSTEM MENU" is displayed at step 174. The subscriber presses "STO" at step 175 to select the system menu. The system menu comprises a subset of menus. At step 177, the subscriber presses either the up or down arrow keys to scroll through the list of menus until "Monitor Mode" is displayed at step 180. The subscriber then presses "STO" at step 183 to select the monitor mode menu. The controller responds by displaying the current monitor mode function default state at step 186 which is either "MONITOR MANUAL" or "MONITOR AUTO." "MONITOR MANUAL" is equivalent to the default condition being inactive, and conversely, "MONITOR AUTO" is equivalent to the default condition being active. The details of these two states will be discussed later.

At step 189, the subscriber presses either the up or down arrow key to toggle the display between default states. This causes the controller to display either "MONITOR MANUAL" at step 192 or "MONITOR AUTO" at step 195. Once the subscriber has selected the desired state, "STO" is pressed ate step 198 to make the default selection. The controller responds by implementing the selected default state and displaying "STORED" for two seconds at step 201. Finally, the controller returns to the standby condition at step 138.

Figure 13:
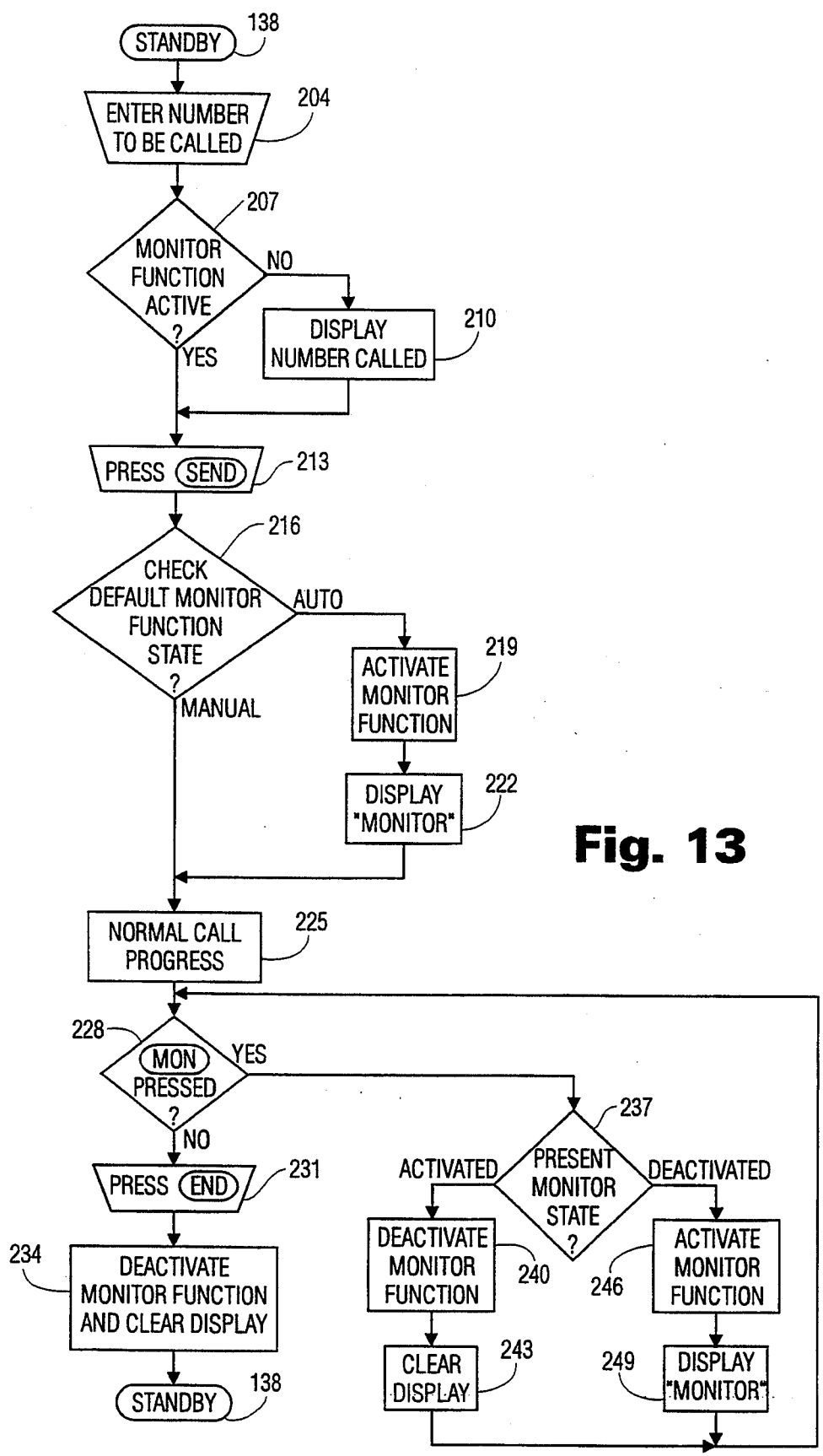
FIG. 13 is a flow diagram of the call initiation sequence in the preferred embodiment.

Reference is directed to FIG. 13 which is a flow diagram of the call initiation sequence in the preferred embodiment of the present invention. From the standby condition at step 138, the subscriber enters the telephone number to be called at step 204. At step 207, the controller checks to see if the monitor function is currently active. If it is not, the controller displays the number called at step 210. On the other hand, if the monitor function is active at step 207, step 210 is bypassed. The subscriber presses "SEND" at step 213 to initiate the call. At step 216, the controller checks the default state of the monitor function. If the default state is "AUTO", the controller activates the monitor function at step 219, and displays "MONITOR" at step 222. Then, the normal call progress proceeds at step 225. Returning to step 216, if the default state was manual, the controller continues with normal call progress at step 225. Normal call progress is either a duplex conversation if the monitor function is inactive wherein the subscriber holds the portable telephone near their ear and mouth, or, if the monitor function is active, a simplex, listen only, conversation wherein the received audio is routed through the loud speaker and both the ear speaker and microphone have been deactivated by the controller.

At any time during the conversation, the subscriber may toggle the monitor mode between active and inactive at step 228. The controller continuously checks the "MON" key at step 228 and if it is pressed, the controller checks the present monitor state at step 237. If the monitor function is presently activated, the controller deactivates the monitor function at step 240. The controller subsequently clears the display at step 243 and returns to step 228 to continue check if the "MON" key is again pressed. Returning to step 237, if the monitor function is presently deactivated, the controller activates the monitor function at step 246 and displays "MONITOR" at step 249. Next, the controller returns to step 228 to continue checking if the "MON" key is again pressed.

At step 228, if the "MON" key is not pressed, the conversation continues in the normal way until the subscriber presses "END" at step 231 to terminate the call. The call having been terminated, the controller deactivates the monitor function and clears the display at step 234 and returns to the standby condition at step 138.

Figure 14:
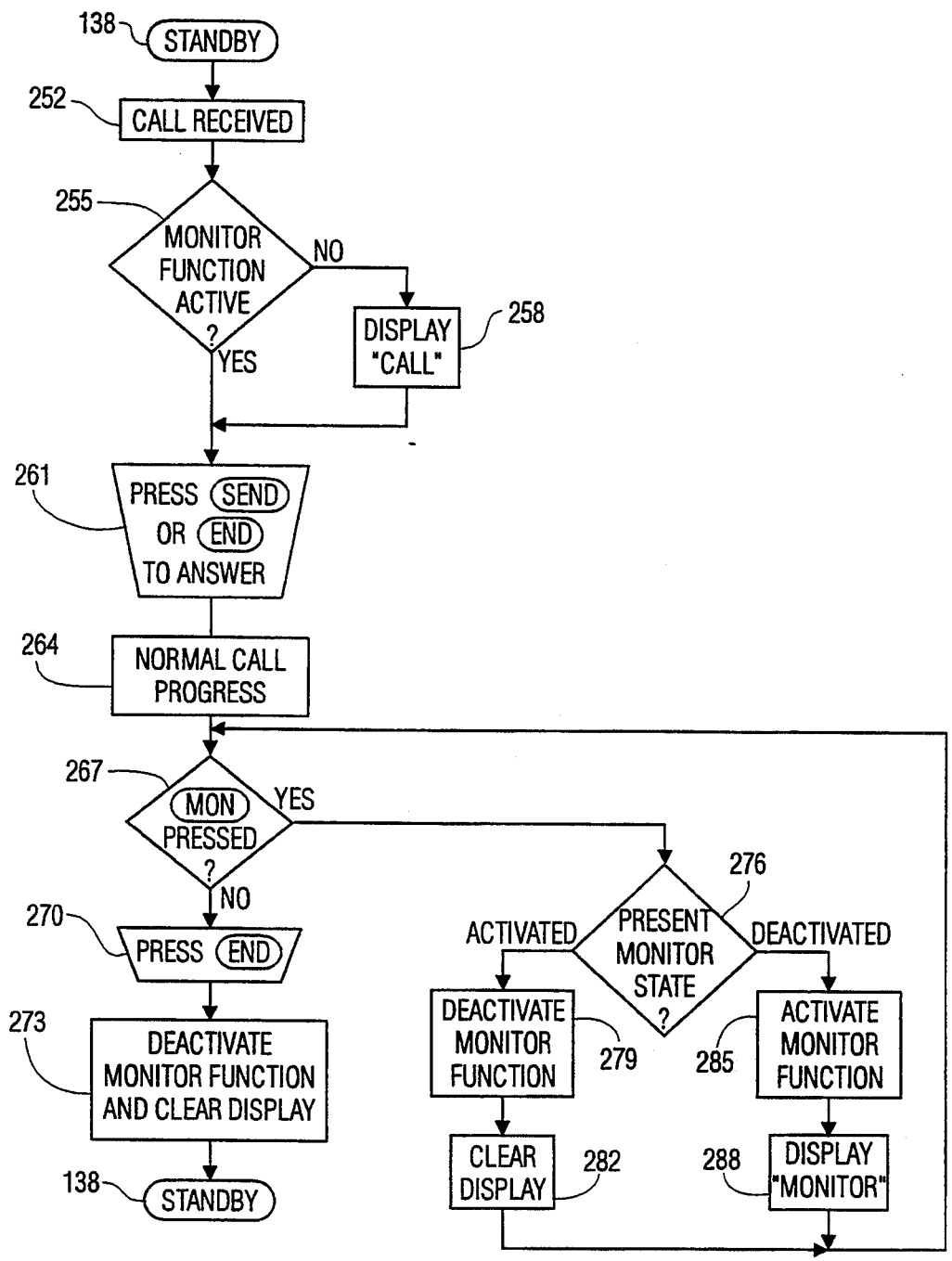
FIG. 14 is a flow diagram of the call reception sequence in the preferred embodiment.

Reference is directed to FIG. 14 which is a flow diagram of the call reception sequence. From the standby condition at step 138, the cellular portable telephone receives a call in accordance with the cellular signaling protocol at step 252. Next, the controller checks to see if the monitor function is presently active at step 255. If the monitor function is not active, the controller displays "CALL" on the display at step 258. If on the other hand, the controller does not display call and in either case, the controller waits for the subscriber to press "SEND" or "END" to received the call at step 261.

Normal call progress proceeds at step 264 while the controller continuously checks to see if "MON" is pressed at step 267. At any time during the conversation, the subscriber may toggle the monitor mode between active and inactive at step 267. The controller continuously checks the "MON" key at step 267 and if it is pressed, the controller checks the present monitor state at step 276. If the monitor function is presently activated, the controller deactivates the monitor function at step 279. The controller subsequently clears the display at step 282 and returns to step 267 to continue check if the "MON" key is again pressed. Returning to step 276, if the monitor function is presently deactivated, the controller activates the monitor function at step 285 and displays "MONITOR" at step 288. Next, the controller returns to step 267 to continue checking if the "MON" key is again pressed.

At step 267, if the "MON" key is not pressed, the conversation continues in the normal way until the subscriber presses "END" at step 270 to terminate the call. The call having been terminated, the controller deactivates the monitor function and clears the display at step 273 and returns to the standby condition at step 138.

While the foregoing specification and drawings enable those skilled in this and related arts to practice the present invention in accordance with the preferred embodiment, the claimed invention encompasses a broader scope. Further modifications and improvements may occur which will make obvious manifold variants of the present invention. The claims appended hereunto are intended to read upon all such variants.

What is claimed is:

1. A portable telephone, comprising:
   a transceiver for transmitting and receiving radio signals, said transceiver having a transmit port for inputting signals to be transmitted and a receive port for outputting received signals,
   a controller for controlling the portable telephone, said controller being coupled to said transceiver,
   a first amplifier having an output port and having an input port coupled to said receive port of said transceiver, said first amplifier being coupled to said controller such that said controller can enable and disable said output port of said first amplifier,
   a loud speaker coupled to said output port of said first amplifier,
   a microphone circuit coupled to said transmit port of said transceiver, said microphone circuit being coupled to said controller such that said controller can enable and disable said microphone circuit,
   a second amplifier having an output port and having an input port coupled to said receive port of said transceiver, said second amplifier being coupled to said controller such that said controller can enable and disable said output port of said second amplifier,
   an ear speaker coupled to said output port of said second amplifier, and
   a monitor function selector for selecting a monitor function, said monitor function selector having an activated and deactivated state, said monitor function selector being coupled to said controller wherein activation of said monitor function selector causes said controller to enable said output port of said first amplifier, disable said output port of said second amplifier, and disable said microphone circuit, and wherein deactivation of said monitor function selector cause each of said output ports of said first and second amplifiers and said microphone circuit to assume the opposite of said enabled and disabled states, respectively.

2. The portable telephone of claim 1, further comprising:
   a default function selector coupled to said controller for selecting one of at least a first and a second default state wherein said first default state causes said monitor function to be operable in accordance with said activated and deactivated states of said monitor function selector, and said second default state causes said monitor function to be activated upon initiating a telephone call, and wherein said second default condition causes said monitor function to be deactivated upon receiving a telephone call, and send function selector operably coupled to said controller for activating a send function wherein activation of said send function causes said controller to enter the presently selected of said default states.

3. The portable telephone of claim 2, further comprising:

a volume controller having an input port coupled to said transceiver receive port, and having an output port coupled to said first and said second amplifier input ports, and said volume controller coupled to said controller such that said controller controls the volume said loud speaker and said ear speaker, and a volume selector coupled to said controller such that selection of a specified volume causes said controller to control said volume controller in accordance with said specified volume.

4. The portable telephone of claim 3, further comprising:

a tone generator having an output port, said tone generator being coupled to said controller, and a tone volume controller having an input port coupled to said tone generator output port, and having an output port coupled to said first and said second amplifier input ports, said tone volume controller being coupled to said controller for control thereof.

5. The portable telephone of claim 1, further comprising:

a display coupled to said controller, and a monitor function display state such that activation of said monitor function causes said controller to activate said monitor function display state.

6. The portable telephone of claim 1, wherein:

said controller enables and disables said output port of said first amplifier by enabling and disabling a power supply to said first amplifier, said microphone circuit comprises a condenser microphone, said controller enables and disables said microphone circuit by enabling and disabling a power supply to said condenser microphone, and said controller enables and disables said output port of said second amplifier by enabling and disabling a power supply to said second amplifier.

7. The portable telephone of claim 6, wherein:

said controller enables or disables a power supply that controls both of said microphone circuit and said second amplifier.

* * * * *